ps://

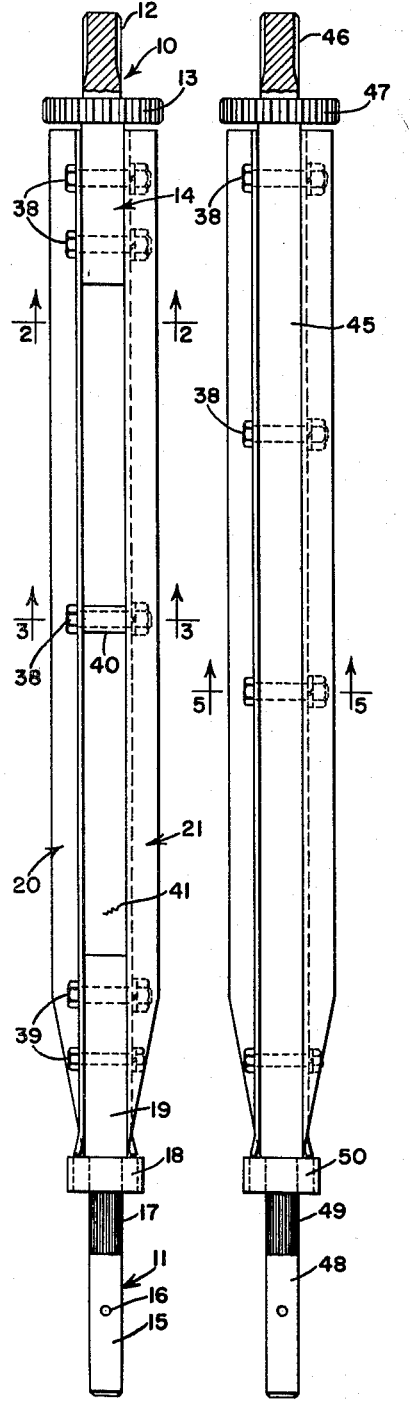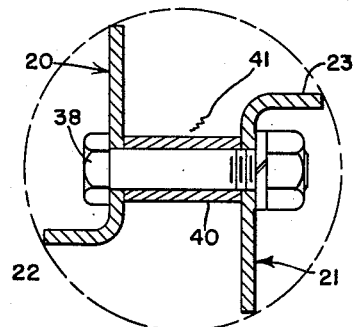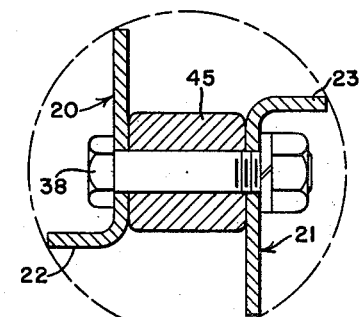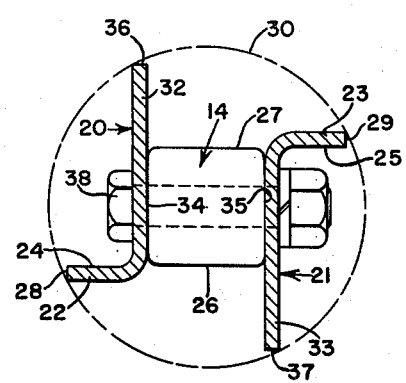

United States Patent Office 3,174,484
Patented Mar. 23, 1965

3,174,484
HARVESTING ROLL
Sidney E. Anderson, Ankeny, Iowa, assignor to Deere & Company, Moline, Ill., a corporation of Delaware
Filed Jan. 23, 1964, Ser. No. 339,674
2 Claims. (Cl. 130—5)

This invention relates to a harvesting roll that may be best utilized in a corn harvester. More particularly, this invention relates to a fabricated type harvesting roll composed of simple elements that may be easily assembled and disassembled.

It is the primary object of the invention to provide a rotatable harvesting roll composed basically of a pair of L-shaped channels with each of the channels having a relatively short-leg portion and a relatively long-leg portion. The short-leg portions are offset on opposite sides of the axis of rotation and project outwardly to outer longitudinal edges disposed in an imaginary cylinder formed about the axis of rotation. The long-leg portions of the L-shaped channels are disposed parallel to one another and are offset from the axis of rotation so as to define a longitudinal and diametrically extending slot opening to opposite sides of the roll. Spacing means are provided in the slot and rigidly interconnect the long-leg portions.

In one form of the invention the spacing means is a longitudinally extending square-shape core disposed in the slot between the long-leg portions with opposite sides of the core being fixed to the long-leg portions. In a second form of the invention, the spacing means is composed of longitudinally spaced spacer elements extending across the slot so that the slot will remain substantially open throughout its length. In the latter form, part of the spacing means are short core portions disposed in the slot at opposite ends of the L-shaped channels. The cores are connected to a drive means at one end of the roll and to a journaled means at the oppposite end. In this latter form of the invention, the channels, due to their channel shape, afford longitudinal rigidity to the roll structure.

It is still a further object of the invention to provide with the above type of harvesting roll structures, a means for connecting the channels to the spacer elements adapted for disconnection. In the form shown, the connecting means consists merely of bolts extending through the spacing elements and the channels. It is, however, advantageous to have a means for disconnecting the channels from the core means so that the harvesting roll may be disassembled while on the machine and without detaching the drive and journaled means from the remainder of the machine.

Other objects and advantages of the present invention will become apparent to those skilled in the art as the nature of the invention is better understood from the following description and as shown in the accompanying drawings.

FIG. 1 is a plan view of the harvesting roll structure.
FIG. 2 is a sectional view taken substantially along the line 2—2 of FIG. 1.
FIG. 3 is a sectional view taken substantially along the line 3—3 of FIG. 1.
FIG. 4 is a plan view of a modified form of the invention shown in FIG. 1.
FIG. 5 is a sectional view taken substantially along the line 5—5 of FIG. 4.

The harvesting roll herein to be disclosed may be of the type mounted in any of a number of conventional type of corn harvesters and particularly of a type shown in U.S. Patent 2,794,307 that issued to C. S. Morrison et al., June 4, 1956. In the corn harvester shown in this patent, there is provided a pair of snapping bars above the harvesting rolls. The rolls normally draw the stalks including the ears downwardly until the ears on the stalks contact the snapping bars and are disengaged from the stalks.

In the form of the invention shown in FIGS. 1–3, there is provided a basic core means composed at one end of a drive portion 10 and at the opposite end of a journaled portion 11. The drive portion 10 has a splined end 12 that may engage a drive element for the harvesting roll and a spur gear portion 13 provided to drive an adjacent roll. The harvesting rolls operate in pairs and consequently, the conventional method of driving the rolls is to drive one roll by means of the spline 12 and to drive the opposite roll by means of the spur gear 13. The drive portion 10 further includes a basic square-sectioned core portion 14 projecting forwardly a short distance from the spur gear 13. The journal end 11 is composed of a forwardly projecting round portion 15 that normally extends into a forward gathering point, not shown, of a harvesting roll. The point may be connected by a pin, not shown, extending through a pin opening 16. Roll journals, not shown, are carried on a splined portion 17. A thrust portion 18 is provided for journal support, by conventional means, on the corn harvester. A short rearwardly projecting square-section portion 19 extends from the journal portion 18. The square-section portions 14, 19 are identical with each having first and second pairs of opposed elongated sides joined at square corners.

The square-section portions 14, 19 are interjoined by elongated L-shaped channels 20, 21 having relatively outwardly extending short flange or leg portions 22, 23 with innersides 24, 25 respectively parallel to one another and generally coplanar with opposite sides 26, 27 of the core 14 and similarly located relative to a similar pair of sides on the opposite core portion 19. The short-leg portions 22, 23 extend outwardly to free ends 28, 29 lying on an imaginary cylinder, such as indicated in dotted representation at 30, formed about the axis of rotation of the harvesting roll. The channel members 20, 21 further include relatively long flanges or leg-portions 32, 33 lying adjacent the remaining sides 34, 35 of the core portion 14, and alongside similar sides of the core portion 19, and extending from the short-leg portions 22, 23 to free ends 36, 37 that also lie on the imaginary cylinder 30. The leg portions 32, 33 are parallel to one another and consequently, the core means 14, 19 operate as spacer means between the channels 20, 21. The channels 20, 21 are bolted by bolt and nut combinations 38, 39 respectively to the short core-portions 14, 19 respectively.

The core portions 14, 19 extend only a short distance into the area between the channels 20, 21. Consequently the leg portions 32, 33 of the channels 20, 21 form a diametrical slot 41 extending across the harvesting roll and opening to opposite sides thereof. The slot 41 is generally uninterrupted throughout its length, although as may be seen in FIGS. 1 and 3 additional spacer means in the form of a cylinder or collar 40 are intermittently provided throughout the length of the channels 20, 21 and have opposite edges thereof bearing against the respective leg portions 32, 33. The bolt and nut combination 38 that extends through the collar 30 may then have the bolt head and the nut operate as abutting elements that maintain uniform spacing between the channels 20, 21. Longitudinal rigidity in the harvesting rolls is provided by the channel elements 20, 21 respectively.

In the form of the invention shown in FIGS. 4 and 5, the harvesting roll is composed of a pair of L-shaped channels 20, 21 but such is retained on a central core 45, square shaped in cross section, and as indicated in FIG. 5, substantially of the same dimensions as the core portions 14, 19 of the previous form. The core 45 extends the full length of the channel elements 20, 21 and therefore, increases the longitudinal rigidity of the harvesting roll. The core 45 has at one end splines 46 capable of engaging a suitable drive member and a spur gear 47 capable of driving a similar spur gear fixed to an adjacent harvesting roll. The forward end of the core 45 is provided with a round shaft end 48, that may be inserted into a forward harvesting point, and a splined portion 49 for receiving bearing members, not shown. Also supported on the core 45 is a thrust portion 50. The core 41 is rigidly connected and retains spacing between the channels 20, 21. The core 41 is rigidly mounted thereto by means of spaced apart bolt and nut combinations 38.

In the form of the invention shown in FIGS. 1–3, there are particular advantages relative to the weight involved of the finished roll. There is further advantage in the fact the roll itself may be disassembled completely without disassembling other portions of the harvester. This may simply be done by removing the bolt and nut combinations 38, 39 and dismantling the roll. The core portions 14, 19 may then be removed from the harvester. Also, by having the slot 41 generally open throughout the length of the harvesting roll, there is the advantage of having trash passing through the roll thereby making it easier to remain clear. Also, the overall cost of the roll is considerably less since the core portion does not extend the full length of the roll.

In both forms of the invention, should the channel members 20, 21 become damaged, it is a simple matter of replacing them by merely removing the bolt and nut combinations 38, and/or 39.

While only two forms of the invention have been shown, it should be recognized that other forms and variations will occur to those skilled in the art. Therefore, while the preferred forms are shown for the purpose of clearly and concisely illustrating the principles of the invention, it is not the intention to limit or narrow the invention beyond the broad concepts set forth in the appended claims.

What is claimed is:

1. A rotatable harvesting roll comprising: an elongated central core, square shaped in cross section, having first and second pairs of opposed elongated sides joined at corners; a pair of substantially identical elongated L-shaped plates fixed to the core on the respective first pair of opposed sides, with each of the L-shaped plates having relatively long and short-leg portions with inner and outer surfaces and extending from a corner juncture substantially ninety degrees from one another with the longer of the leg portions having its outer surface next to the respective side and being fixed to the respective side of the core so that the juncture is beyond one corner substantially the thickness of the short-leg whereby the inner surface of the short leg is substantially coplanar with one side of the second pair of opposed sides and the longer leg portion extends beyond the other side of the second pair of opposed sides to its free edge lying in an imaginary cylinder formed about the axis of rotation, and the shorter of the leg portions has its free edge lying in the same imaginary cylinder and the outer edges divide the imaginary cylinder into 90° segments.

2. A rotatably driven harvesting roll comprising: a pair of elongated L-shaped channels having relatively long and short leg portions with the short leg portions disposed in planes parallel to one another and offset substantially equal distance on opposite sides of the axis of rotation and projecting in opposite directions to their outer free edges disposed in a common imaginary cylinder formed about the axis of rotation, and the long leg portions being substantially parallel to one another and offset substantially equal distance on opposite sides of the axis and projecting from the short leg portions across the spacing between the short-leg portions to their free ends also disposed on the aforementioned imaginary cylinder, said long-leg portions thereby defining a diametrical slot opening to opposite sides; and spacing structure rigidly interconnecting the channels and disposed in the slot within the spacing between the aforesaid planes, said latter structure being in part core portions extending into the spacing between the long-leg portions and adjacent opposite ends of the channels and terminating adjacent the respective ends whereby the diametrical slot formed by the long-leg portions and opening to opposite sides will be substantially uninterrupted and will be terminated at opposite ends by the respective core portions.

References Cited by the Examiner
UNITED STATES PATENTS

| | | | |
|---|---|---|---|
| 2,538,965 | 1/51 | Fergason | 130—5.1 |
| 3,001,527 | 9/61 | Jones | 130—5.1 |
| 3,100,491 | 8/63 | Dillon | 56—104 X |

T. GRAHAM CRAVER, *Primary Examiner.*

ANTONIO F. GUIDA, *Examiner.*